(12) United States Patent
Lenhart et al.

(10) Patent No.: US 6,871,104 B1
(45) Date of Patent: Mar. 22, 2005

(54) METHOD FOR THE PRODUCTION OF AN OPEN-LOOP CONTROL BLOCK AND SAID CONTROL BLOCK

(75) Inventors: Bernd Lenhart, Wachenroth (DE); Helmut Simmerer, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,445
(22) PCT Filed: May 15, 2000
(86) PCT No.: PCT/DE00/01526

§ 371 (c)(1),
(2), (4) Date: Nov. 21, 2001

(87) PCT Pub. No.: WO00/72097

PCT Pub. Date: Nov. 30, 2000

(30) Foreign Application Priority Data

May 25, 1999 (DE) ......................... 199 23 977

(51) Int. Cl.⁷ ............................................. G05B 11/01
(52) U.S. Cl. ............................. 700/18; 700/19; 700/20; 700/86; 700/87; 700/88; 710/105; 713/1; 713/2; 713/100
(58) Field of Search .............................. 700/17, 18, 19, 700/20, 83, 86, 87, 88, 89; 710/105; 713/1–2, 100

(56) References Cited

U.S. PATENT DOCUMENTS

| | | | | |
|---|---|---|---|---|
| 4,639,852 A | * | 1/1987 | Motomiya | ...................... 700/9 |
| 5,058,043 A | * | 10/1991 | Skeirik | ........................ 700/167 |
| 5,452,420 A | * | 9/1995 | Engdahl et al. | ............. 710/105 |
| 5,801,942 A | * | 9/1998 | Nixon et al. | .................. 700/83 |
| 6,009,268 A | | 12/1999 | Reis et al. | |
| H1853 H | * | 6/2000 | Wilkiewicz | .................. 709/203 |
| 6,266,726 B1 | * | 7/2001 | Nixon et al. | ................. 710/105 |
| 6,414,594 B1 | * | 7/2002 | Guerlain | ...................... 340/506 |
| 6,581,847 B2 | * | 6/2003 | Kline et al. | ................. 236/49.3 |

FOREIGN PATENT DOCUMENTS

| | | |
|---|---|---|
| DE | 196 15 389 A1 | 10/1997 |
| DE | 196 21 828 A1 | 12/1997 |
| EP | 0 331 551 B1 | 9/1989 |
| EP | 0860 758 A1 | 8/1998 |
| WO | WO 97/03389 | 1/1997 |
| WO | 97/03389 | 1/1997 |

OTHER PUBLICATIONS

"L'Objet d'automatisme: application de concepts d'objet a la programmation des automates", Mouna Mellah et al., APII, vol. 29, n. Jan. 1995, pp. 39 to 79.

"L'objet d'automatisme: application de concepts d'objet á la programmation des automates", Mellah et al., APII. vol. 29–n° Jan. 1995, pp. 39 á 79.

"SPS–Esperanto", Manfred Holder, Industrie–Elektrik & Elecktronik, 33, Jahrgang 1988, Nr. 1, pp. 16–18.

(List continued on next page.)

Primary Examiner—Ramesh Patel
(74) Attorney, Agent, or Firm—Harness, Dickey & Pierce, P.L.C.

(57) ABSTRACT

With a method for producing the control module, the control module is assembled from a number of program modules which are designed for one basic function in each case. Each program module has an interface of an interface type defined by the respective basic function. A functional connection is preferably only established between two program modules if the two program modules have mutually corresponding interfaces of the same interface type. The method permits simple, quick and in particular rule-based automatic production of the control module of a control system for controlling a plant component.

28 Claims, 2 Drawing Sheets

OTHER PUBLICATIONS

"Bausteinkonzept füR die Programmierung von Fertigungsaufgaben", Eckhard Hohwieler et al., *Carl Hanser Verlag Munchen ZWF* 91, pp. 254–257 (1996).

"Visual Basic –Dad Kompendium", Peter Monadjemi, *Markt & Technik Buch–und Software–Verlang GmbH*, pp. 159–163, 1997.

* cited by examiner

METHOD FOR THE PRODUCTION OF AN OPEN-LOOP CONTROL BLOCK AND SAID CONTROL BLOCK

This application is the national phase under 35 U.S.C. § 371 of PCT International Application No. PCT/DE00/01526 which has an International filing date of May 15, 2000, which designated the United States of America, the entire contents of which are hereby incorporated by reference.

FIELD OF THE INVENTION

The invention generally relates to a method for producing a control module of a control system for controlling a plant component and to a control module produced using the method.

BACKGROUND OF THE INVENTION

In an industrial plant, for example in a power generation plant, individual plant components are connected to one another by a control system (process control system), in particular a digital control system. Such a plant component may be a valve or a motor for example. An individual plant component usually interacts here with a multiplicity of other plant components, and its operating state is dependent on the operating states of the other plant components. The control system is used to monitor the operating states, and the plant is controlled automatically or manually. To operate the plant, it is necessary to record the data of the various plant components and establish the interrelationships between the data. Based on this data, a control instruction is then sent by the process control system to the respective plant component, either automatically or in response to a manual input instruction of the operator.

For the control of a plant component, a so-called control or function module is usually employed in the control system to record the individual data, evaluate it and if appropriate, forward it after preprocessing.

Owing to the manifold ways in which the plant components interact and the resulting large volume of data, the control or function modules are very large and complex. The greater their complexity, the more difficult it becomes to follow the internal function sequences of the individual control module. Owing to the manifold interactions to be taken into account, the creation of a control module is likewise highly complex, and consequently time-consuming. Moreover there is a risk of errors arising during the design and programming of the control module which are not detected.

Adapting an existing control module to a specific plant also requires a multiplicity of settings and parameter inputs. Only then can the existing control module be integrated in the process control system of the specific plant. Users find it difficult to grasp the complex dependencies within the control module and its functions. As a result, modifying an existing control module is time-consuming and requires a lot of effort. In addition, it is very difficult to predict the effects of modifications to the control module, that is to say to specific circuits or program flows. Moreover, the control module is often not used optimally, so that some of its functions remain unused. For the most part, control modules are intentionally equipped with a large number of functions to cover as many requirements as possible. This requires a large amount of computing power, even if the multiplicity of functions is not necessary for a specific plant.

Described in WO97/03389 is a method for creating a function plan in which inputs and outputs of modules displayed on the screen are connected to one another by a user drawing lines. A program stored in the computer then performs a plausibility check on the connections between the modules.

The disadvantage of this is that drawing lines is prone to errors and the subsequent plausibility check is costly.

SUMMARY OF THE INVENTION

The object of the invention is to disclose a method for producing a control module in which the control module can be created as easily and with as few defects as possible, and which has a structure that is readily comprehensible to the user. A further object of the invention is to disclose a control module produced according to the method.

According to the invention, an object is achieved by a method for producing a control module of a control system for controlling a plant component. Preferably, the control module is assembled from a number of program modules designed for one basic function in each case, and of which each program module has an interface of an interface type clearly defined by the respective basic function. More preferably, a first program module having a first interface is assigned to a second program module having a second interface. A functional connection is then preferably established between the first program module and the second program module if the first interface and the second interface are of the same interface type.

A first aspect of the underlying idea here is the breaking down of the complex overall functionality of the control module into individual elementary basic functions. Preferably, a separate program module is provided for each of these individual basic functions. The modular structure of the function sequences in the control module renders its overall structure very clear and readily comprehensible to a user.

A second aspect of the underlying idea here is the fact that each program module has an interface clearly assigned to its basic function. The first program module is preferably only connected to the second program module if the latter's interface is designed for interfacing with the basic function of the first program module. A specific interface which is clearly different from all other interfaces of the other basic functions is assigned to each basic function. This ensures that only program modules designed for a functional interconnection can be connected to one another. When a user is assembling the control module from the individual program modules, this consequently precludes the possibility of errors resulting in a malfunctioning of the control module. The control module can thus be easily created.

The creation or production of the control module is also understood here to include any necessary modifications, for example, as a result of plant-specific requirements for an already existing control module. An advantage of the method is conferred by the fact that it is possible to make the necessary modifications simply by selecting the specific program module requiring modification. The program module may then either be modified or replaced by a plant-specific program module.

For better clarity, the basic function of at least one of the program modules is preferably assembled from a number of subfunctions. For example an "instruction generation" control module is provided in which the data arriving from various components is recorded, processed and evaluated. The subfunctions are expediently assigned to the different components.

It is particularly advantageous if the at least one program module has the same number of interfaces as the number of subfunctions, with each individual one of said interfaces being clearly defined by the subfunction. The aforesaid "instruction generation" program module would accordingly have a number of specific interfaces. For example, it has an interface A' for recording the data from a device A and a further interface B' for recording the data B from a device B. The data from device A is preferably only transferred to the program module via the interface of the type A' provided for the data.

The functional connection between two program modules can therefore be compared to the joining of two jigsaw pieces: each piece of the jigsaw has a specific geometric shape having convexities and concavities with which only the respective matching piece can mate. It is not possible to join two jigsaw pieces that do not fit. A program module divided into a plurality of subfunctions is comparable to a jigsaw piece to which a plurality of other jigsaw pieces may be simultaneously connected. The interfaces of the program modules therefore represent the convexities and concavities on the technical programming level.

To enable the control module to be produced as simply and quickly as possible, the individual program modules are preferably selected from a library. The library is, for example, a data store in which a multiplicity of program modules having different functions are stored.

In order wherever possible to equip the control module only with the functions required in the specific plant, the required functionality of the control module is specified, and the program modules required are selected on the basis of this specification.

The functionality is preferably specified by a user input, to be precise the user is prompted to specify the functionality by using a query routine. For example a screen-driven dialog with the user is provided for this purpose, in the course of which the user is questioned about the plant components provided for the plant. The user enters the specifications for the respective plant component in a corresponding dialog field.

The user input is preferably subjected to a plausibility check to prevent malfunctions occurring on the assembled control module. If required by the plausibility check, a program module which has a basic function essential for the functionality of the control module, but which was not specified by the user, is automatically selected.

In a particularly preferred embodiment, the control module is assembled from the program modules on the basis of predetermined rules, in particular automatically assembled. For example, a first rule specifies that a program module M is automatically selected if a program module N was selected, or else that the program module M is excluded if program module N was selected. A second rule provides that, preferably, only interfaces having compatible attributes are connected to one another. For example, the type and number of inputs and outputs of an interface, as well as the data format of the data to be exchanged between two program modules, are compared when connecting two program modules. A third rule provides, for example, that an input module, via which inputs are transferred to the control module, operates with an output module via which data is output from the control module. And a fourth rule may include adherence to certain processing sequences of flow processes determined by causalities.

The program modules with their function-specific interfaces are a basis for the assembly of the control module according to fixed rules. In particular they are highly advantageous for automatic assembly. With automatic assembly, the user need only enter the plant-specific data. On the basis of these inputs, the required overall functionality of the control module is determined; the corresponding program modules are automatically selected and assembled. The automatic production of the control module offers considerable time savings in comparison with manual production of the control module. Moreover, user-specific errors are precluded.

Preferably at least the internal interfaces active only within the control module are standardized so that data exchange between the program modules via said internal interfaces is not influenced by changes to the internal program flow of a program module. The advantage of standardizing the interfaces is that any necessary plant-specific adaptations to individual program modules can be readily performed. There is no risk here that such modifications will have an adverse effect on the functional interaction of the individual program modules.

In addition to internal interfaces, the control module also has external interfaces via which it is connected to external components, for example to another control module, to the plant component, or to a data line.

For external data exchange between the control module and the plant component, a device-specific device module is preferably selected as the program module. In particular, the device module has a device-specific interface; it is designed as a type of driver or communications module which enables the control module to communicate with the plant component.

To achieve an object associated with the control module, the control module is produced in accordance with the method described above. Similar advantages and special embodiments that apply to the method apply somewhat analogously to the control module.

BRIEF DESCRIPTION OF THE DRAWINGS

An exemplary embodiment of the invention is described in greater detail below with reference to the figures, in which, schematically in each case.

DETAILED DESCRIPTION OF THE PREFERRED EMBODIMENTS

Figure 1:
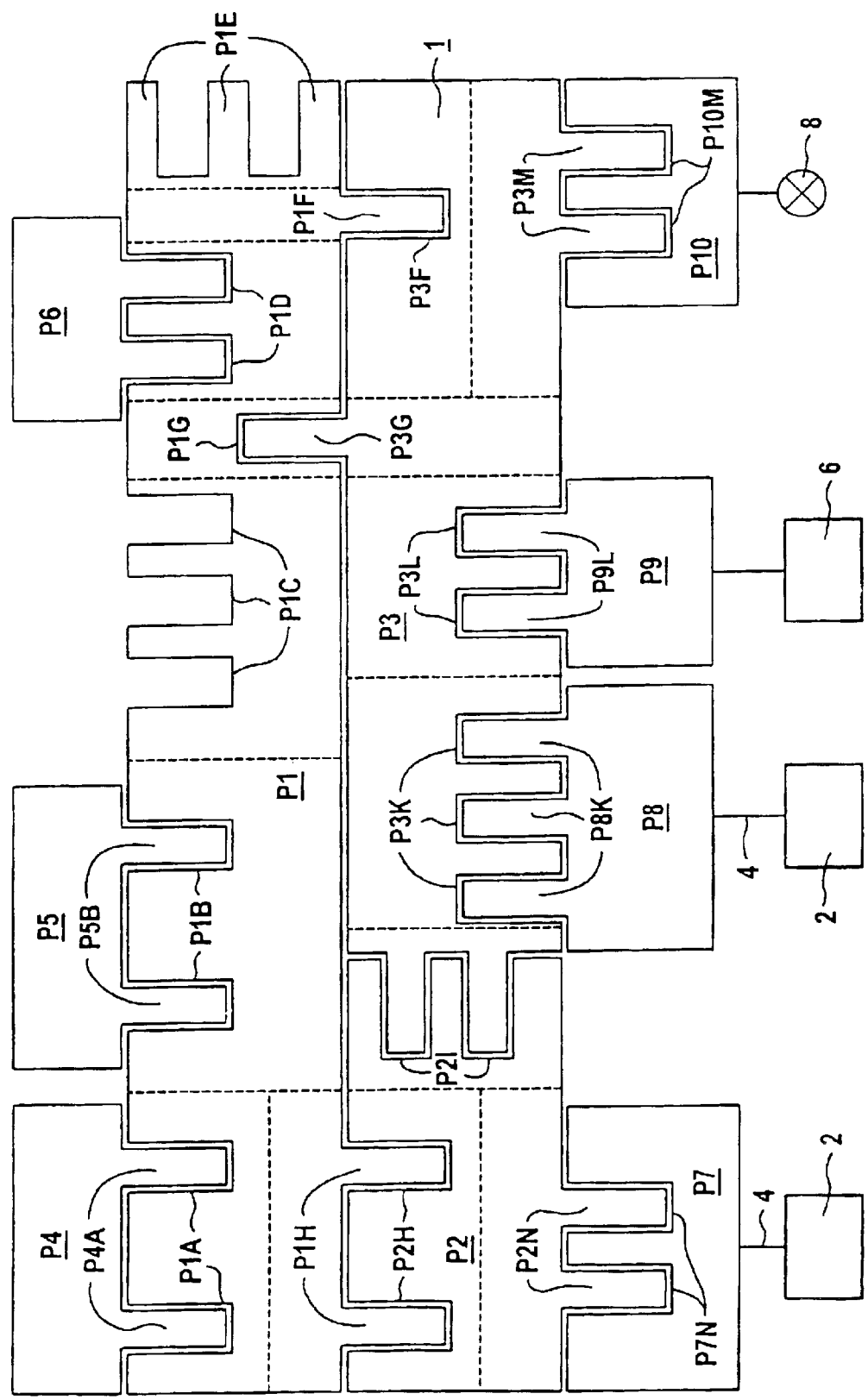
FIG. 1 shows a control module assembled from individual program modules.

According to FIG. 1, a control module 1 has a plurality of program modules P1 to P10 which are functionally interconnected. The control module 1 is designed to control a plant component 2, for example for the drive control of a motor. In the exemplary embodiment, the basic functions of the program modules P1, P2 and P3 are divided into a plurality of subfunctions which are indicated by dashed lines in each case. Only a single basic function is assigned in each case to the remaining program modules P4 to P10.

The program modules P1 to P3 have a plurality of interfaces and the program modules P4 to P10 have only one interface in each case. The designation of the interfaces in FIG. 1 will be explained further below. The definition of the individual interfaces is defined by the special basic function or the subfunction of the program module. For this purpose specific programming attributes are assigned to the interfaces, such as for example the type and number of inputs or outputs, the data format used for communication between the program modules P1 to P10, or a data address assigned to the program module.

The program module P1 has for example the function "priorities and instruction generation" as its basic function. The basic function is divided into a plurality of subfunctions. One of these serves to process operator instructions. Assigned to the subfunction is an interface P1A of the program module P1, via which the latter is connected to the program module P4 having the basic function "operator instructions". For this the program module P4 has an interface P4A compatible with the interface P1A. The two interfaces P4A and P1A have mutually corresponding attributes so that they are compatible with one another.

An interface type having attributes clearly defined by the respective basic function or subfunction is therefore assigned to each program module P1 to P10. The interface types, which can be clearly distinguished from one another, are denoted by letters A to N in FIG. 1, with the same letter denoting the same interface type. Indicated here as interfaces of the same interface type are interfaces having mutually corresponding attributes. A type A interface P1A of the program module P1 can therefore only have a functional connection with a corresponding type A interface P4A of another program module, for example of the program module P4. The same applies to the program module P5 having the basic function "automatic instructions", by means of which instructions automatically triggered by the process control system are generated and output. The program module P5 has an interface P5B which is designed for the functional connection with the corresponding interface P1B of the program module P1. Since the interface types A and B are different, the program module P5 cannot be connected to the interface P1A via its interface P5B. The same applies analogously to all further program modules.

It is not necessary for a program module to be connected to each interface P1A to P1H of the program module P1. Depending on the overall functionality required for the control module 1, some subfunctions of the program module P1 can remain unused. In this case some interfaces, interfaces P1C and P1E in the exemplary embodiment, therefore remain unassigned. They are designed for example for communicating with another control module, and a program module designed for communication with the further control module can be subsequently connected to them without any problem. The interfaces P1C and P1E are therefore to be viewed as external interfaces that have no internal effect in the control module 1.

The program module P6 has for example the basic function "protection instructions" which is used to process instructions for protecting the plant component. Like all other interfaces generally, the associated type D interface also has an output and an input. The program module P2 has the basic function "storage" and serves to store instructions before they are output externally. Instructions are output here via the program module P7 having the basic function "instruction output". For this the two program modules P2 and P7 are connected via the interface combination P2N–P7N. For controlling the plant component 2, the control module 1 is connected via the program module P7 to said plant component 2.

For this purpose, the program module P7 is designed in particular as a device-specific device module. It therefore preprocesses the instructions output by the program module P2 so that they can be executed by the plant component 2. Its interface P2N can therefore be viewed as an external interface to the specific device module. The device module P7 thus provides for the communication between control module 1 and plant component 2. If the plant component 2 is exchanged, the device module P7 need only be adapted to the new plant component 2, or the old device module P7 need only be replaced by a new one. The internal processes in the control module 1 remain unaffected by this.

The output of instructions via the device module P7 is preferably to a data bus 4. The instructions are transferred to the plant component 2 over the data bus 4. The data bus 4 is designed, for example, as a field bus, through which various plant components 2 are connected to one another.

The program module P3 has the basic function "record messages". In addition to recording messages from plant component 2, it also serves to monitor the latter. It is connected to the program module P1 and to the program module P2 for data exchange. In addition it has interfaces P3K, P3L and P3M, via which it is connected to the program modules P8, P9 and P10 respectively. The program module P8 has for example the basic function "record acknowledgements", and the program module P9 has the basic function "record switchgear". Accordingly, the acknowledgements, for example from the plant component 2, are processed via the program module P8. And in program module P9 the messages from a switchgear unit 6 are processed. The program module P10 serves for example to monitor and control at least one pilot lamp 8 of an operating or control screen 24 (cf. FIG. 3) visible to the operator. The program module P10 has the basic function "lamps".

The internal program flows of the individual program modules P1 to P10 are self-contained and do not interact directly with the internal program flows of other program modules. The individual program modules P1 to P10 can therefore be designated non-interacting. They communicate with one another only via their standardized interfaces. Modification of the internal program flow of a program module P1 to P10 does not affect the interface function.

Figure 2:
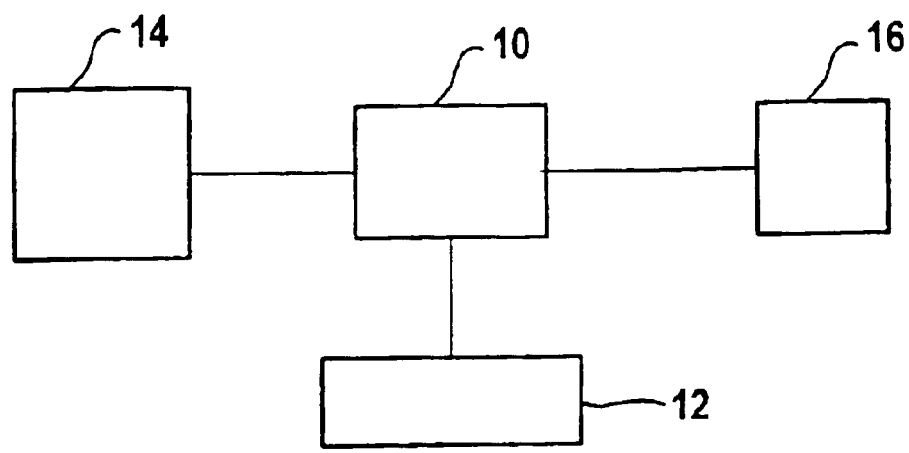
FIG. 2 shows a technical arrangement of devices for carrying out the method for producing the control module.

With the method for producing the control module 1, the functionality of the control module 1 is preferably defined first. This is performed in particular using a dialog or query routine with the user. According to FIG. 2, there is provided for this purpose a computer unit 10 which is connected to an input device 12, a display device 14 and a data store forming a library 16. Stored in the computer unit 10 is a query routine, in the course of which the user is questioned about the desired functionality of the control module 1. For this, the user can communicate with the computer unit 10 via the display device 14, for example via a screen, and via the input device 12, for example via a keyboard. Displayed on the display device 14 is a query or input screen, by means of which the user is prompted to enter and define plant-specific features. The user enters the features via the input device 12.

On the basis of the overall functionality of the control module 1 determined from the user's inputs, the computer unit 10 automatically selects the necessary program modules from the library 16 and combines them on the basis of the rules likewise stored in the computer unit 10. The user's inputs are here subjected to a plausibility check. The computer unit 10 is designed in such a way that it detects incorrect or inadequate inputs and reacts accordingly, for example with an error message or a repeated prompt. Program modules which are necessary for the desired overall functionality of the control module 1, but which were not entered by the user, are also automatically selected from the library 16 by the computer unit 10.

The library 16 includes a multiplicity of individual program modules for different requirements, so that wherever possible the necessity of programming a program module is dispensed with when producing a special control module 1 adapted to a specific plant component.

Figure 3:
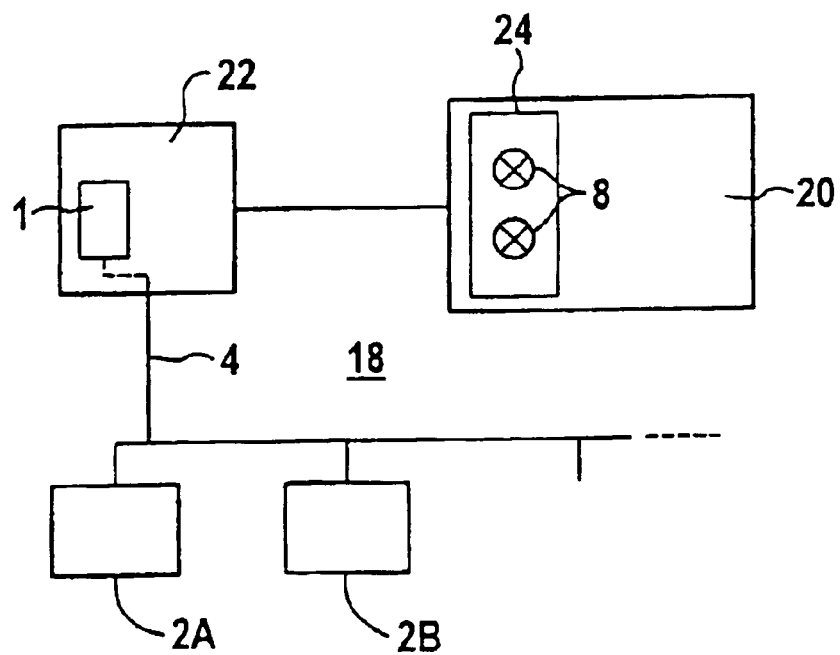
FIG. 3 shows a greatly simplified block diagram of a plant.

According to FIG. 3, a plant 18, for example a power generation plant, has a control console 20 and a number of plant components 2A, 2B, of which only two are illustrated. The plant components 2A, 2B and the control console 20 are connected to a control system 22 which has the control module 1 for controlling one of the plant components 2A, 2B. For this purpose the control system 22 is connected to the plant components 2A, 2B via a data bus 4. The control console 20 has an operating or control screen 24 comprising a number of pilot lamps 8. The plant 18 can be controlled and monitored from the control console 20.

It is preferred for the method for producing the control module 1 that the overall functionality of the control module 1 is divided into a plurality of basic functions and subfunctions. More preferably, each basic function is handled by one program module P1 to P10. The program modules P1 to P10 have here in each case interfaces of different interface types A to N which are clearly defined by the basic functions or subfunctions. The modular structure and the clearly defined interfaces in particular enable the automatic rule-based production of the control module 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for generating a control module of a control system for controlling a plant component, comprising:
   assembling the control module from at least two program modules, each designed for one respective basic function, wherein each program module includes an interface of an interface type defined by the respective basic function; and
   assigning a first program module including a first interface to a second program module including a second interface, wherein a functional connection is established between the first program module and the second program module if the first interface and the second interface are of the same interface type.

2. The method as claimed in claim 1, wherein the basic function of at least one of the program modules is assembled from at least two subfunctions.

3. The method as claimed in claim 2, wherein the at least one program module includes an equal number of interfaces and subfunctions.

4. The method as claimed in claim 3, wherein at least one of the program modules are selected from a library.

5. The method as claimed in claim 3, wherein a functionality of the control module is specified, and wherein the control module selects the at least two program modules on the basis of the specification of said functionality.

6. The method as claimed in claim 3, wherein at least one program module including one of the basic functions "operator instructions", "automatic instructions", "protection instructions", "instruction generation", "storage", "instruction output", "record messages", and "lamps" is selected from the program modules.

7. The method as claimed in claim 2, wherein at least one of the program modules are selected from a library.

8. The method as claimed in claim 2, wherein a functionality of the control module is specified, and wherein the control module selects the at least two program modules on the basis of the specification of said functionality.

9. The method as claimed in claim 2, wherein at least one program module including one of the basic functions "operator instructions", "automatic instructions", "protection instructions", "instruction generation", "storage", "instruction output", "record messages", and "lamps" is selected from the program modules.

10. The method as claimed in claim 1, wherein at least one of the program modules are selected from a library.

11. The method as claimed in claim 10, wherein at least one program module including one of the basic functions "operator instructions", "automatic instructions", "protection instructions", "instruction generation", "storage", "instruction output", "record messages", and "lamps" is selected from the program modules.

12. The method as claimed in claim 1, wherein a functionality of the control module is specified, and wherein the control module selects the at least two program modules on the basis of the specification of said functionality.

13. The method as claimed in claim 5, wherein the functionality is specified by a user input.

14. The method as claimed in claim 13, wherein the user input is subjected to a plausibility check, and wherein a program module includes a basic function used for the functionality of the control module, not specified by the user, and automatically selected.

15. The method of claim 13, wherein the functionality is elicited from the user using a query routine.

16. The method as claimed in claim 1, wherein the control module is assembled from the program modules on the basis of rules.

17. The method of claim 16, wherein the control module is automatically assembled.

18. The method as claimed in claim 1, wherein the internal interfaces, active only within the control module, are standardized so that data exchange between the program modules within the control module is not influenced by changes to the internal program flow of a program module.

19. The method as claimed in claim 1, wherein for external data exchange between the control module and the plant component, a device-specific device module is selected as the program module.

20. The method of claim 19, wherein the external data exchange is over a data bus.

21. The method as claimed in claim 1, wherein at least one program module including one of the basic functions "operator instructions", "automatic instructions", "protection instructions", "instruction generation", "storage", "instruction output", "record messages", and "lamps" is selected from the program modules.

22. The method as claimed in claim 1, wherein the at least one program module includes an equal number of interfaces and subfunctions.

23. A control module of a control system, for controlling a plant component, comprising:
   at least two program modules, each designed for one respective basic function, wherein each program module includes an interface of an interface type defined by the respective basic function, wherein a first program module including a first interface is assigned to a second program module including a second interface, and wherein a functional connection is established between the first program module and the second program module if the first interface and the second interface are of the same interface type.

24. The control module as claimed in claim 23, wherein the basic function of at least one of the program modules is assembled from at least two subfunctions.

25. The control module as claimed in claim 24, program module includes an equal number of interfaces and subfunctions.

26. The control module as claimed in claim 23, wherein the at least one program module includes an equal number of interfaces and subfunctions.

27. The control module as claimed in claim 23, program modules are selected from a library.

28. The method control module as claimed in claim 27, wherein at least one program module including one of the basic functions "operator instructions", "automatic instructions", "protection instructions", "instruction generation", "storage", "instruction output", "record messages", and "lamps" is selected from the program modules.

* * * * *